(12) United States Patent
Tien

(10) Patent No.: US 6,767,232 B1
(45) Date of Patent: Jul. 27, 2004

(54) ELECTRICAL CARD CONNECTOR HAVING WRITE-PROTECT AND FULL-INSERTION SWITCHES

(75) Inventor: Yung-Cheng Tien, Hsin-Chuang (TW)

(73) Assignee: Tekcon Eletronics, Corp., Taipei Hsien (TW)

( * ) Notice: Subject to any disclaimer, the term of this patent is extended or adjusted under 35 U.S.C. 154(b) by 0 days.

(21) Appl. No.: 10/645,894

(22) Filed: Aug. 20, 2003

(30) Foreign Application Priority Data

Nov. 13, 2002 (TW) ........................................ 91218166 U

(51) Int. Cl.$^7$ ............................................. H01R 13/62
(52) U.S. Cl. ...................................................... 439/159
(58) Field of Search ................................ 439/159, 160, 439/157, 155, 152, 630, 607, 608, 609, 610, 267

(56) References Cited

U.S. PATENT DOCUMENTS

| 6,394,827 B2 | * | 5/2002 | Nogami | 439/159 |
| 6,394,843 B1 | * | 5/2002 | Chang et al. | 439/607 |
| 6,478,591 B1 | * | 11/2002 | Chang | 439/159 |
| 2001/0053622 A1 | | 12/2001 | Oguchi | |

FOREIGN PATENT DOCUMENTS

JP     2001-135383     5/2001

* cited by examiner

*Primary Examiner*—Son V. Nguyen
(74) *Attorney, Agent, or Firm*—Wei Te Chung

(57) ABSTRACT

An electrical card connector (100) includes an insulative housing (2), a number of terminals (6) received in the housing, a shell (3) shielding the housing, and a first and second switch contacts (41, 42) for write-protect and full insertion detection for an electrical card (7). The housing includes a pair of side walls and a receptacle portion. One of the side walls defines a first and a second slits for respectively receiving the first and the second switch contacts. The shell has a generally planar top wall (31) and a pad (33) extending downwardly from one side of the top wall. The first and the second contacts respectively include a first and a second spring portions (413, 423) extending into the receptacle portion of the housing. The electrical card, during being inserted into the receptacle portion, successively pushes the first and the second spring portion outwardly to electrically connect with the pad of the shell.

5 Claims, 8 Drawing Sheets

ELECTRICAL CARD CONNECTOR HAVING WRITE-PROTECT AND FULL-INSERTION SWITCHES

BACKGROUND OF THE INVENTION

1. Field of the Invention

The present invention relates to connectors, and especially to a card connector for electrically connecting an electrical card to an electrical device.

2. Description of the Related Art

Electrical card connectors are usually provided with detect switches for write-protect or full-insertion detection. U.S. patent application Publication Ser. No. 2001/0053622 published on Dec. 20, 2001 disclosed an electrical card connector. The card connector comprises a frame defining a card receptacle portion, a metallic cover member covering the frame and a switch portion for identifying write inhibit for an IC Card. The switch portion includes a contact plate with V-shaped projecting portion extending into the receptacle portion. During insertion of an IC card, the contact plate is pushed outwardly to electrically connect with a side plate portion of the cover. Since the switch portion is constituted by utilizing the side plate portion of the cover member. It is not necessary to dispose two contact plates and thus permitting the reduction in thickness of the card connector. However, an electrically card connector usually has both write-protect and full-insertion switches.

JP Patent Application Publication No. 2001/135383 published on May 18, 2001 disclosed an electrical card connector. The electrical card connector comprises a base, a write-protect switch contact arranged in a longitudinal side wall of the housing, a U-shaped full-insertion switch contact mounted in a rear wall of the housing, and a spring contact also mounted in the longitudinal side wall of the housing and adjacent to the write-protect switch contact. The write-protect switch contact connects with the spring contact. An electrical card is inserted and pushes the write-protect switch contact to move laterally and disconnect with the spring contact. The electrical card is full inserted and pushes the full-insertion switch to connect with a rear portion of the spring contact. However, the write-protect switch contact and the spring contact enlarge the width of the longitudinal side wall and the full-insertion switch contact enlarges the dimension of the rear wall. A card connector with switch contacts with a compact arrangement is desired.

BRIEF SUMMARY OF THE INVENTION

An object of the present invention is to provide an electrical card connector with switch contacts in a compact arrangement.

An electrical card connector of the present invention comprises an insulative housing, a plurality of terminals received in the housing, a shell shielding the housing, and a first and a second switch contacts for write-protect and full insertion detection for an electrical card. The housing includes a pair of side walls and a receptacle portion. One of the side walls defines a first and a second slits for respectively receiving the first and the second switch contacts. The shell has a generally planar top wall and a pad extending downwardly from one side of the top wall. The first and the second switch contacts respectively include a first and a second spring portions extending into the receptacle portion of the housing. An electrical card is inserted into the receptacle portion and successively pushing the first and the second spring portion outwardly to electrically connect with the pad of the shell.

DETAILED DESCRIPTION OF THE INVENTION

Figure 1:
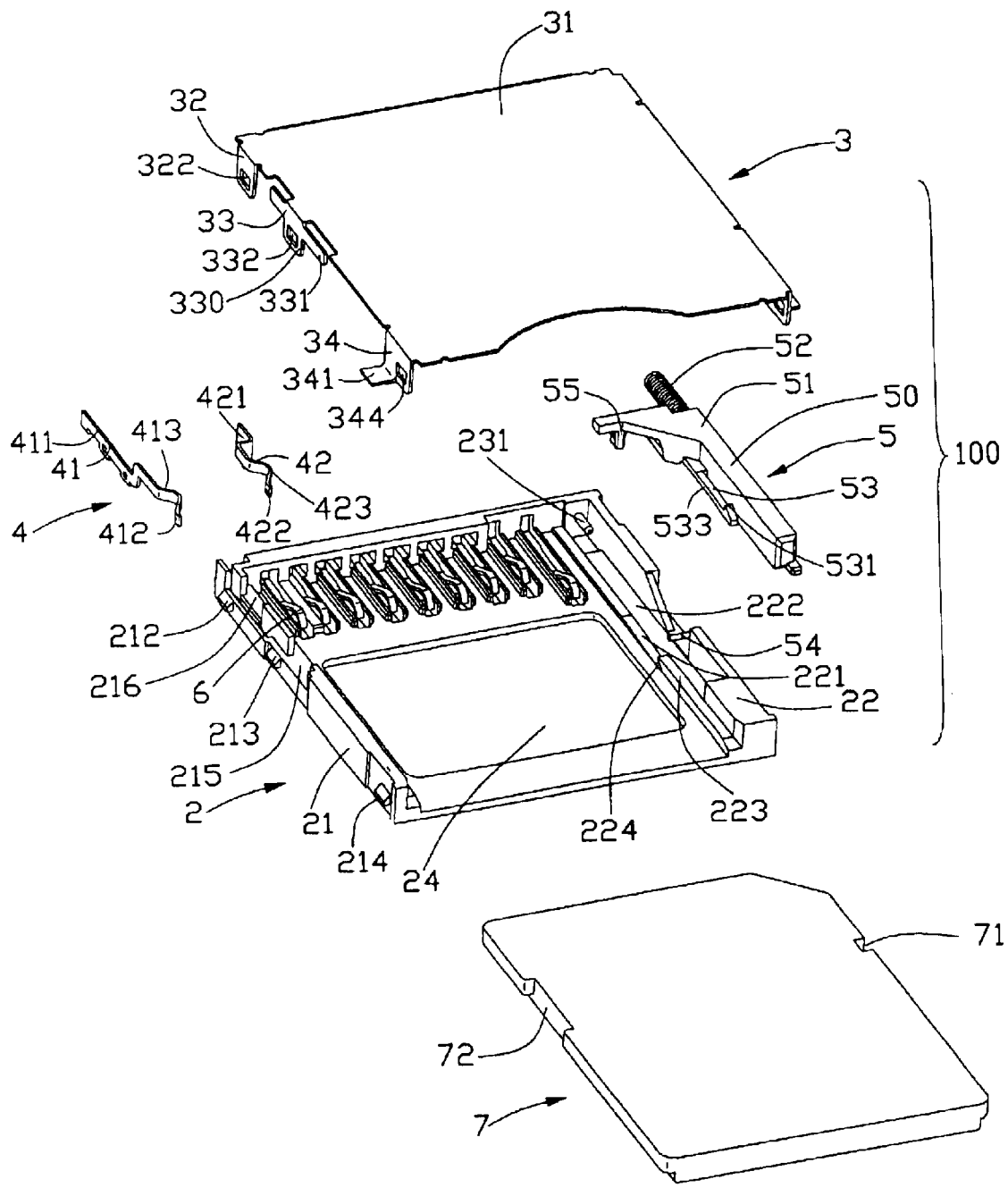
FIG. 1 is an exploded view of an electrical card connector according to the present invention and an electrical card.

Referring to FIG. 1, an electrical card connector 100 comprises an insulative housing 2, a pair of switch contacts 4, an ejector 5 and a plurality of conductive terminals 6 mounted on the housing 2, and a shell 3 shielding the housing 2.

Figure 3:
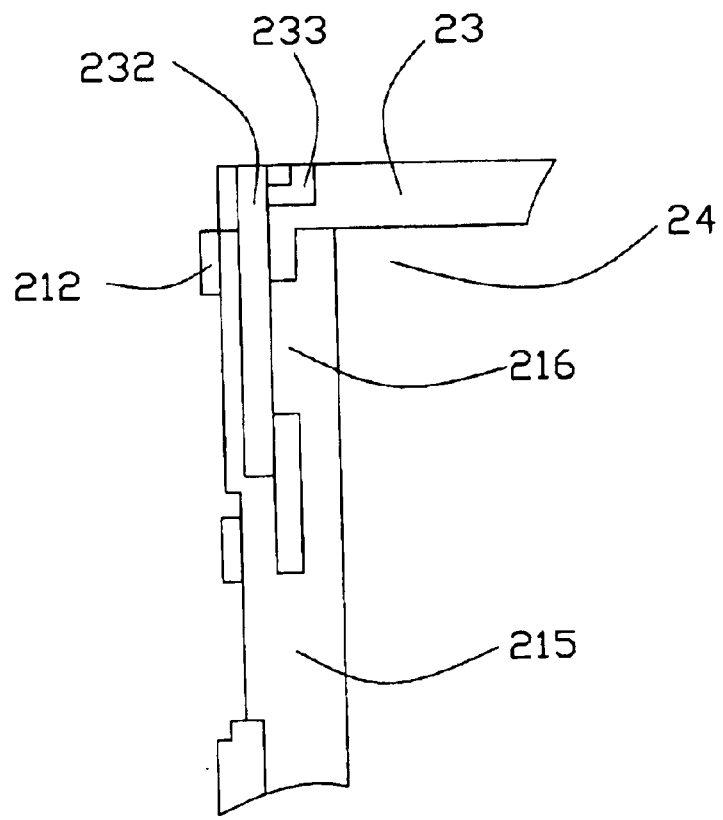
FIG. 3 is a top planar view of a corner of an insulative housing, wherein the switch contacts are mounted.
Figure 4:
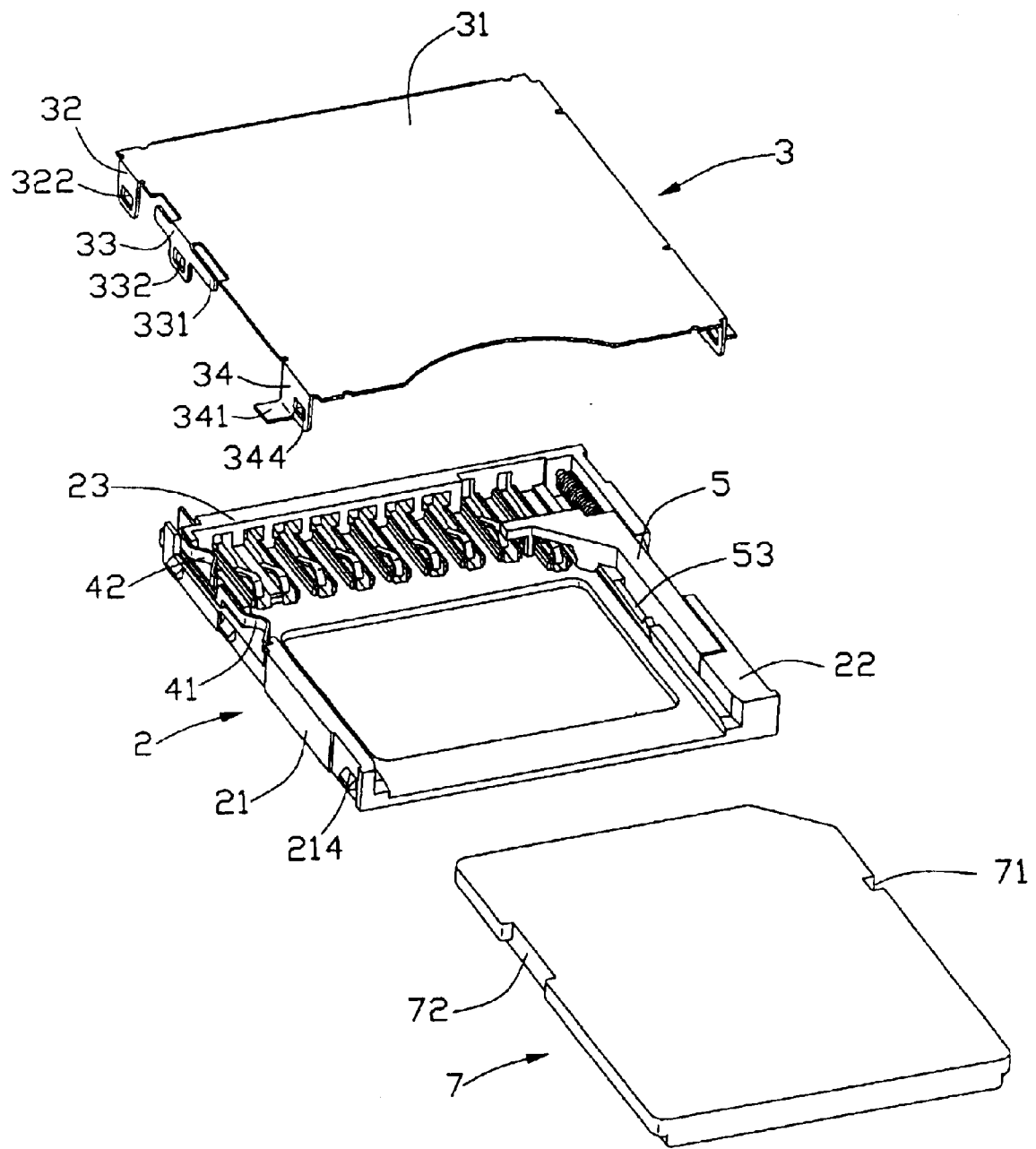
FIG. 4 is a partially assembled view of FIG. 1.

Referring to FIGS. 1 and 3, the housing 2 comprises a first and a second side walls 21, 22, a front wall 23 connecting the first and the second side walls 21, 22 and a receptacle portion 24 defined therebetween for receiving an electrical card 7. A pair of first latches 212, a pair of second latches 213 and a pair of third latches 214 are arranged on outer surfaces of the first and the second side walls 21, 22. The first side wall 21 defines a straight first slit 232 in a longitudinal direction and through the front wall 23, and a first and a second cutout 215, 216 communicating with the receptacle portion 24. The front wall 23 defines a second slit 233 adjacent to the first slit 232. The second wall 22 includes an elongated groove 222 and an elongated raised portion 223 between the groove 222 and the receptacle portion 24. The raised portion 223 has an inclined surface 221 and a V-shaped slot 224 defined in a front end of the inclined surface 221. The V-shaped slot 224 has an inclined rear surface 225 (shown in FIG. 4). The inclined rear surface 225 and the inclined surface 221 constitute a cute angle therebetween. The front wall 23 includes a post 231 extending rearwardly and adjacent to the second side wall 22.

The shell 3 comprises a planar top wall 31, a pair of first tabs 32 and a pair of second tabs 34 extending downwardly from opposite sides of the top wall 31 and a substantially T-shaped pad 33 extending downwardly from one side of the top wall 31. Each second tab 34 further includes a soldering piece 341 extending outwardly from a lower portion thereof. Each first tab 32, the pad 33 and each second tab 34 defines a first, second and third notches 322, 332 and 344 in lower portions thereof for respectively engaging with the first, second and third latches 212, 213 and 214. The T-shaped pad 33 includes a vertical part 330 and a pair of contact ends 331 extending from opposite sides of the vertical part 330. Said second notch 332 is defined in the vertical part 330.

Figure 2:
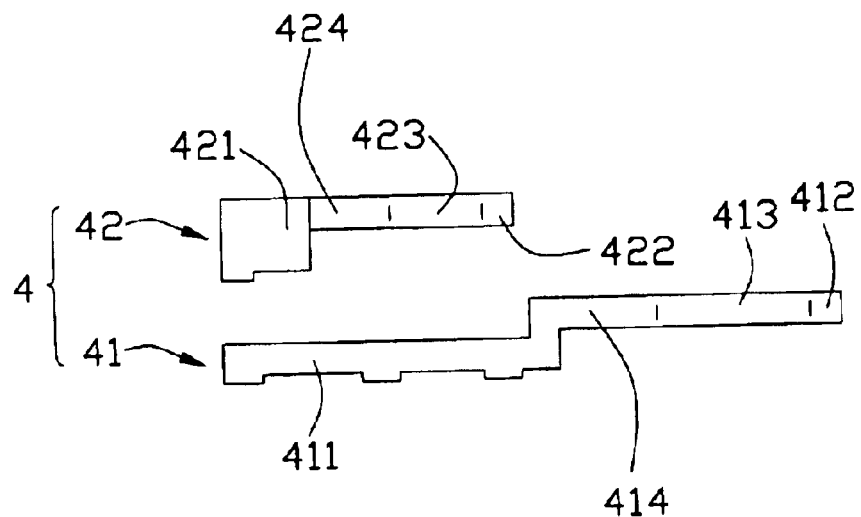
FIG. 2 is side view of a pair of switch contacts.

Referring to FIG. 1 and 2, the switch contacts 4 comprise a first switch contact 41 and a second switch contact 42. The first switch contact 41 comprises a first elongated holding portion 411, a first connecting portion 414 extending upwardly from a rear portion of the holding portion 411, a first arced spring portion 413 extending rearwardly from the connecting portion 411 and a first contact portion 412 on a free end of the first spring portion 413. The second contact 42 comprises a second holding portion 421, a second connecting portion 424 extending upwardly and laterally from a rear end of the second holding portion 421, a second arced spring portion 423 extending rearwardly from the second holding portion 421 and a second contact portion 422 on a free end of the second spring portion 423. The second switch 42 has a length less than that of the first holding portion 411.

Referring to FIG. 1, the ejector 5 comprises a unitary formed L-shaped slider 51, a spring 52 and a locking rod 54. The spring 52 is attached to the slider 51 by being partially received in a hole (not shown) defined in a front portion of the slider 51 or being engaged with a post (not shown) on the front portion of the slider 51. The slider 51 has an elongated base portion 50, an actuator 55 projecting laterally for engaging with a front end of the electrical card 7, a locking branch 53 extending rearwardly from the slider 51 and a heart-shaped cam groove (not shown) in an outer side surface of the slider 51. The locking rod 54 engages with the heart-shaped groove for facilitating a push-push ejection of the electrical card, which is common used in the art and a detailed description is omitted herein. The locking branch 53 includes a spring arm 533 and a locking portion 531 disposed at a free end of the spring arm 533. The locking portion 531 preferably has an inclined rear face 532 (shown in FIGS. 4 and 5) corresponding to the inclined rear surface 225 of the slot 224.

Referring to FIGS. 1, 2, 3 and 4, in assembly, the conductive terminals 6 are mounted in the front wall 23 of the insulative housing 2 with contact fingers (not labeled) extending into the receptacle portion 24 for electrically engaging with golden fingers (not shown) of the electrical card 7. The ejector 5 is installed on the second side wall 22. A free end of the spring 52 engages with the post 231. The base portion 50 is received in the elongated groove 222 of the housing 2 and is movable in a front-to-rear direction. The locking branch 53 is located on the raised portion 223 with the locking portion 531 temporarily received in the slot 224. The inclined face 532 abuts against the inclined surface 225.

The switch contacts 4 are mounted on the first side wall 21. The first holding portion 411 is secured in the first slit 232. The first spring portion 413 extending into the receptacle portion 24 from the first cutout 215. The second holding portion 421 is secured in the second slit 233. The second connecting portion 424 is located above the first holding portion 411 and spaced from the first holding portion 411 in a vertical direction. The second spring portion 423 extends into the receptacle portion 24 from the second cutout 216. The second connecting portion 424, the second spring contact 423 is in a substantially same longitudinal line with the first switch contact 41. The first, second and third notches 322, 332 and 344 respectively engage with the first, second, and third latches 212, 213 and 214, thereby mounting the shell 3 on the housing 2. The electrical card connector 100 is mounted on a printed circuit board (PCB, not shown). The soldering pieces 341 of the shell 3 respectively engage with a grounding circuit on the PCB.

Figure 5:
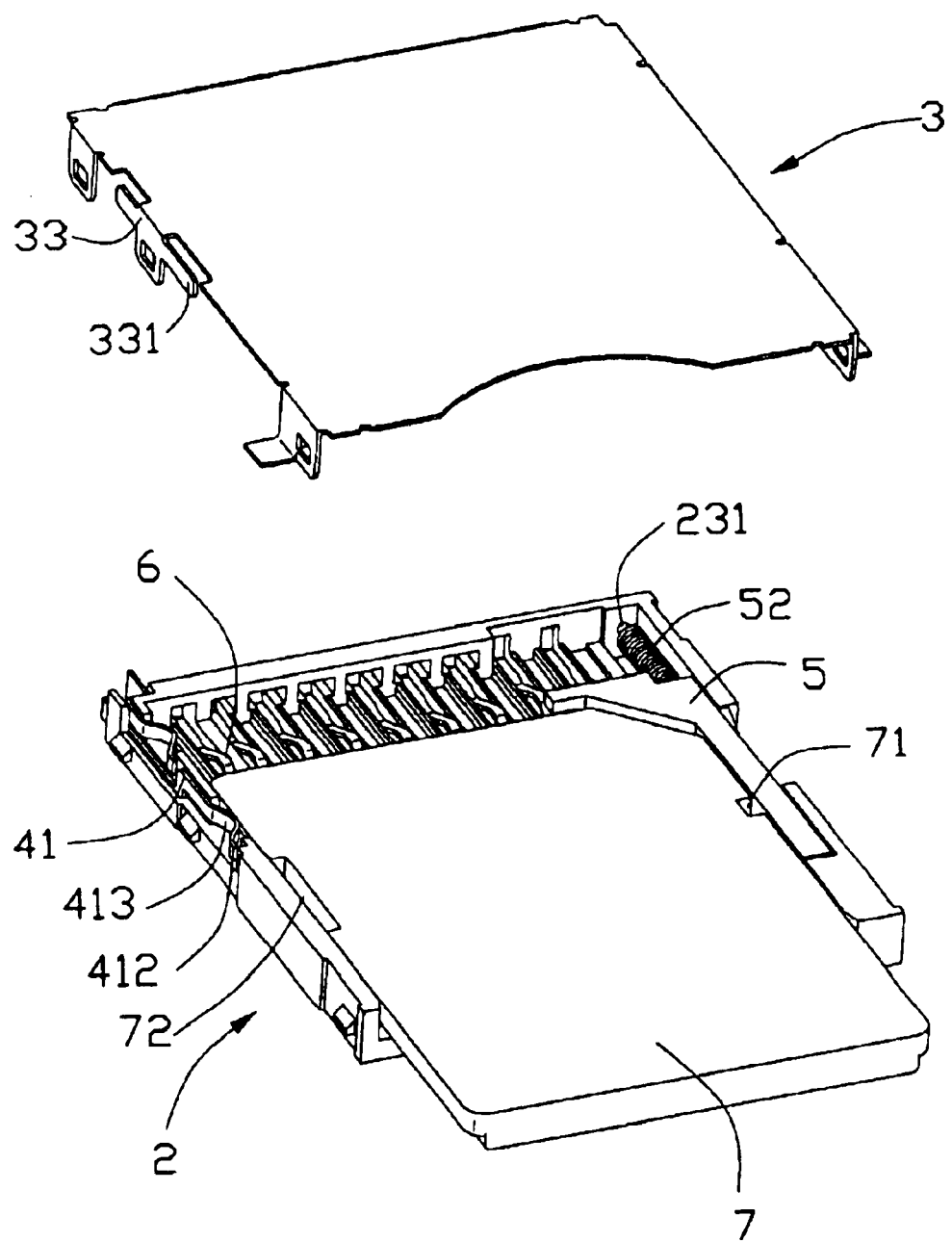
FIG. 5 is a partially assembled view of FIG. 1 with the card being inserted into electrical card connector initially.
Figure 6:
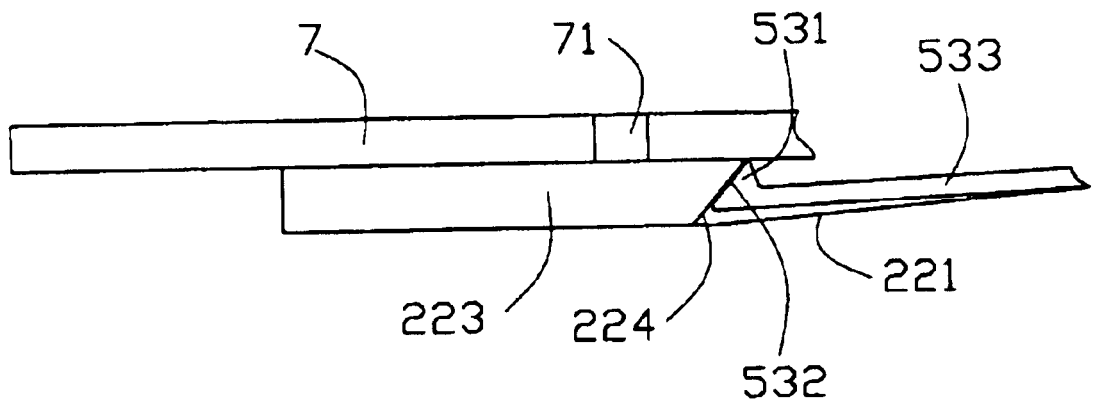
FIG. 6 is a schematic view for FIG. 3, showing an engagement of a locking portion of an ejector with a slot of a sidewall of a housing.
Figure 10:
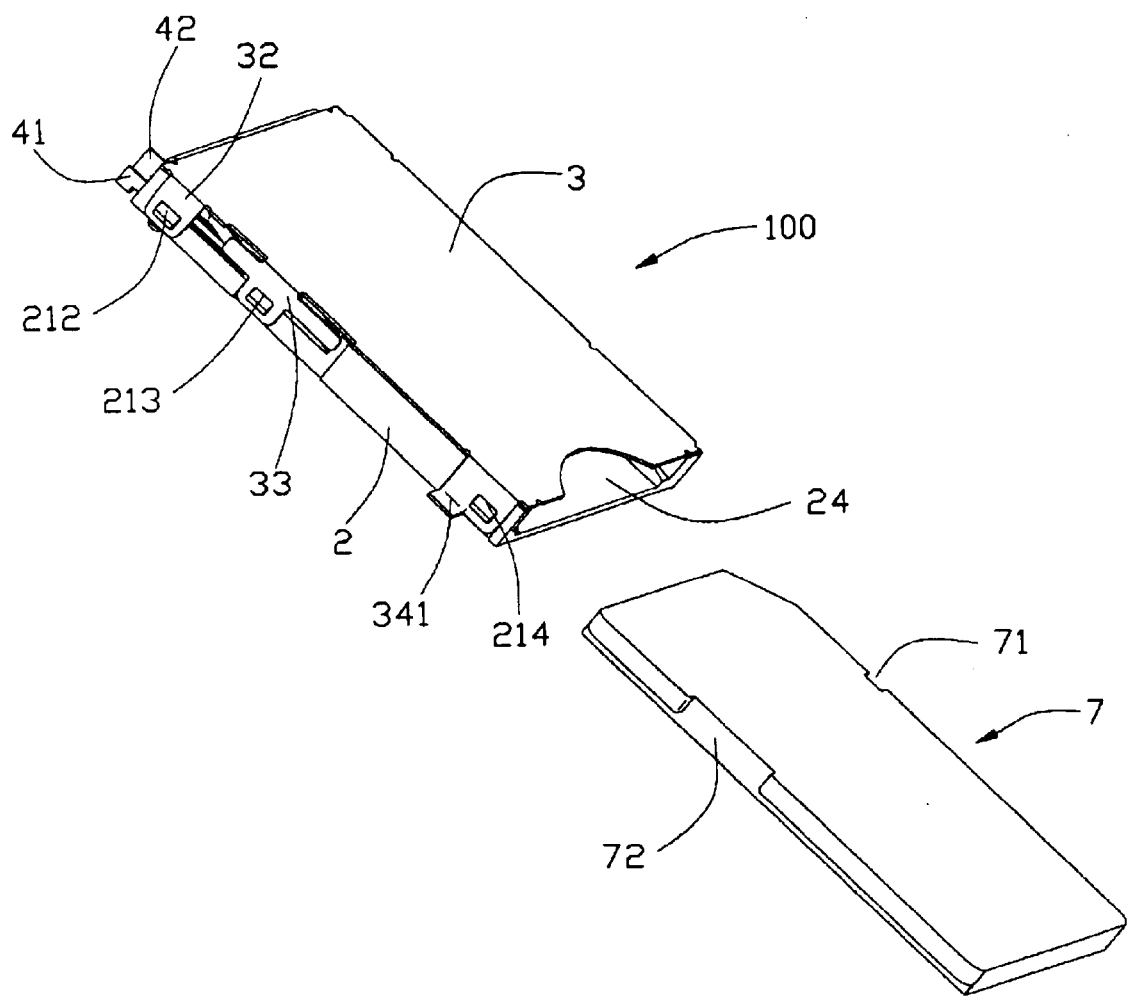
FIG. 10 is an assembled view of FIG. 1 with the card fully inserted therein.

Referring to FIGS. 5, 6 and 10, the electrical card 7 is inserted into the electrical connector 100. A side surface of the electrical card 7 presses against the first spring portion 413 of the first switch contact 41. The first spring portion 413, together with the first contact portion 412, moves laterally, and the first contact portion 412 comes into connecting with a corresponding contact end 331 of the shell 3 for facilitating write-protect of the electrical card 7, at the time, the locking portion 531 is still received in the slot 224.

Figure 9:
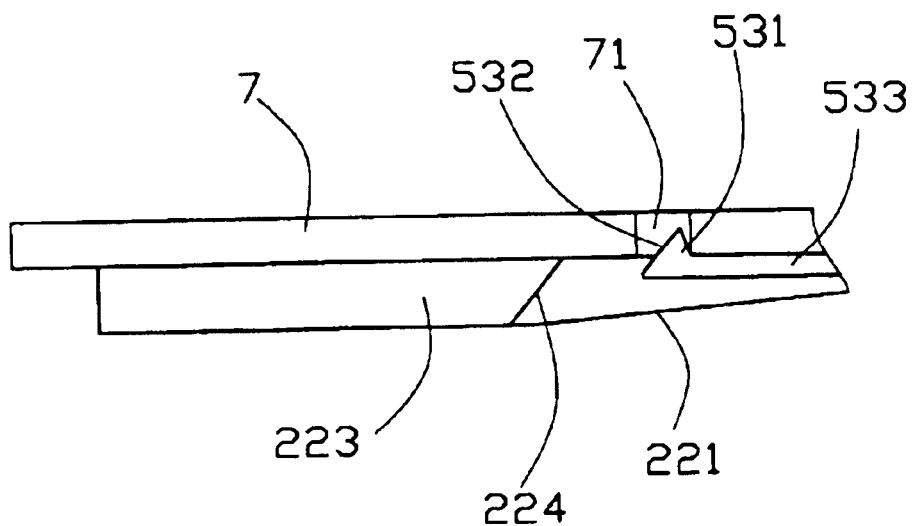
FIG. 9 is a schematic view for FIG. 5 or FIG. 6, showing the locking portion of the ejector with a first recess in a side portion of the card.
Figure 7:
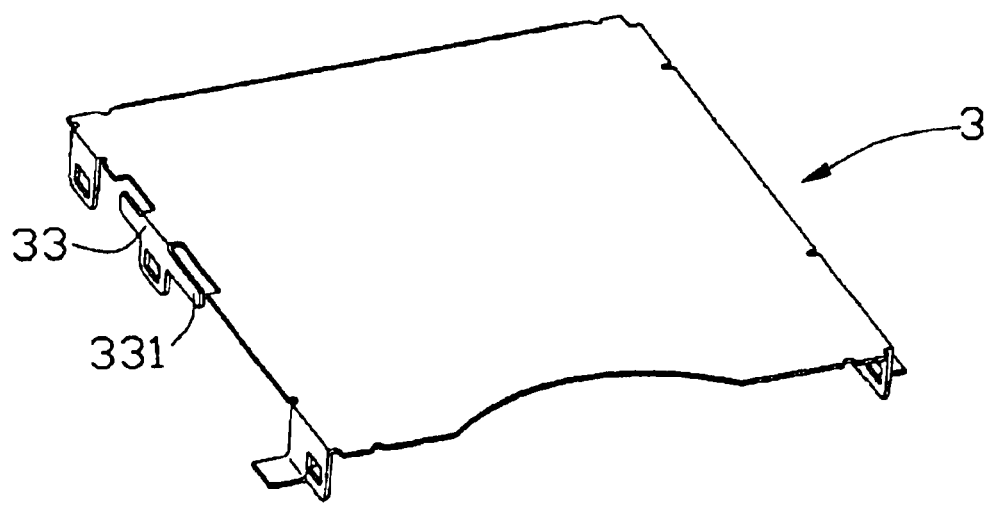
FIG. 7 is a partially assembled view of FIG. 1 during insertion of the card.
Figure 7:
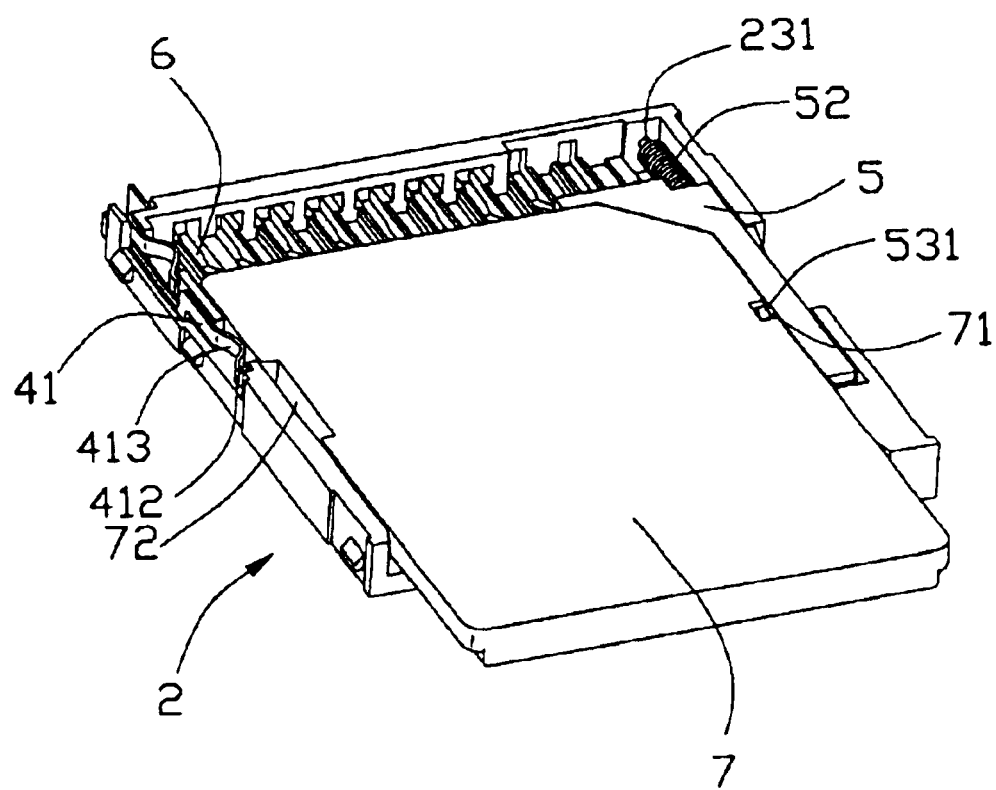

Referring to FIGS. 7 and 9, the electrical card 7 is further inserted into the electrical connector 100, a front surface of the electrical card 7 pushes the actuator 55 of the slider 5 to move forwardly and the spring is depressed. The locking portion 531 moves forwardly and upwardly along the inclined surface 221 and moves out of the slot 222 to engage with a first recess 71 in one side of the electrical card 7.

Figure 8:
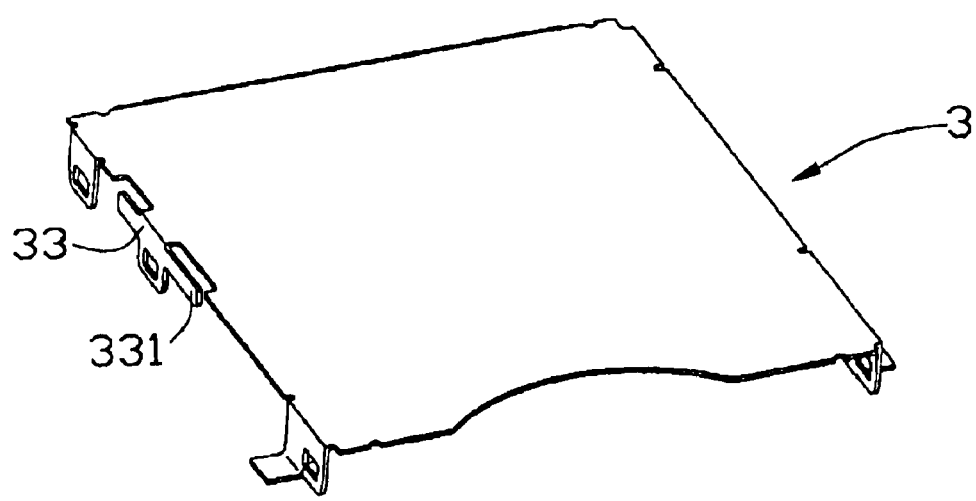
FIG. 8 is a partially assembled view of FIG. 1 with the card being fully inserted into the electrical card connector.
Figure 8:
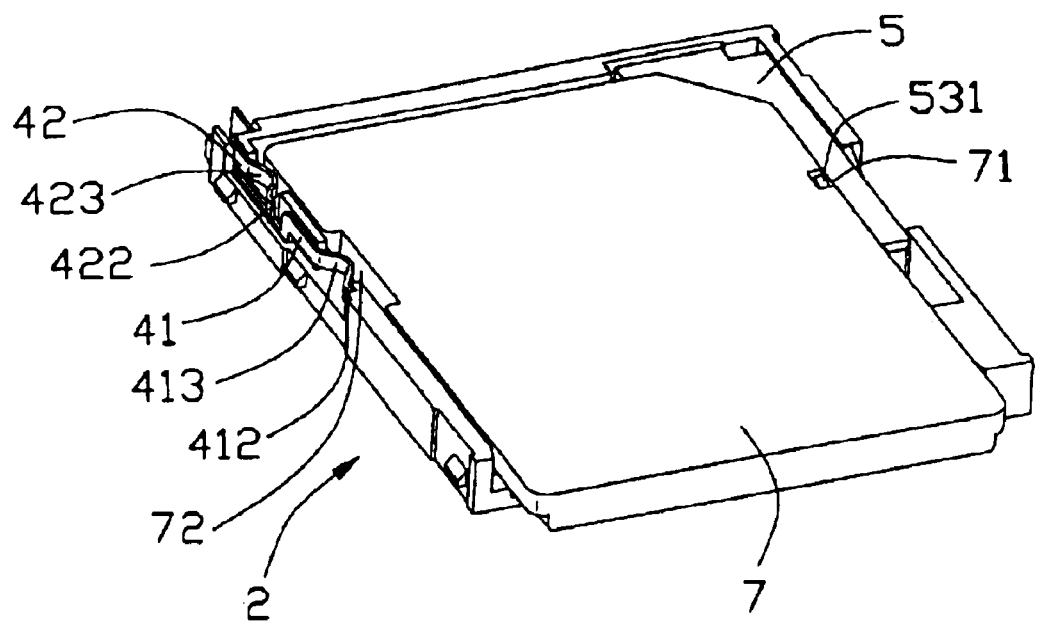

Referring to FIGS. 8, 9 and 10, the electrical card 7 is fully inserted into the electrical connector 100 and reaches a working position. The side surface of the electrical card 7 presses against the second spring portion 423 of the second switch contact 42. The second spring portion 413, together with the second contact portion 422, moves laterally, and the second contact portion 422 comes into connecting with a corresponding contact end 331 of the shell 3 for detecting the insertion of the electrical card 7. The spring portion 413 with the contact portion 412 release spring thereof into a second recess 72 of the card, thereby disengaging with the corresponding contact portion of the pad 33 of the shell 3. The ejector 5 is locked at the working position by engagement of the locking rod 54 with the heart-shaped cam groove which is well know in the art. The locking portion 531 engages with the first recess 71 of the electrical card 7 so as to prevent an inadvertent ejection of the electrical card 7.

The card 7 is ejected from the electrical card connector 100. Exert a forward force on the electrical card 7, the locking rod 54 moves out of the locking position of the heart-cam groove. The compressed spring 52 urges the slider 51 to move rearwardly so as to push the electrical card 7 to moves rearwardly. The locking portion 531 moves rearwardly and downwardly along the inclined surface 221, then arrives in the slot 224 and disengages with the first recess 71 of the electrical card 7. The electrical card 7 moves out of the electrical card connector 100 smoothly.

It is to be understood, however, further though numerous, characteristics and advantages of the present invention have been set fourth in the foregoing description, together with details of the structure and function of the invention, the disclosed is illustrative only, and changes may be made in detail, especially in matters of shape, size, and arrangement of parts within the principles of the invention to the full extent identify by the broad general meaning of the terms in which the appended claims are expressed.

What is claimed is:

1. An electrical card connector for connecting an electrical card to an electronic device, comprising:

an insulative housing having a receptacle portion;

a plurality of conductive terminals mounted in the insulative housing;

a shell shielding the insulative housing, the shell having a generally planar top wall and a T-shaped pad extending downwardly and perpendicularly from one side of the top wall; and first and second switch contacts secured in the housing, the first and second switch contacts having first and second contact portions extending into the receptacle portion of the housing and being successively pushable outwardly by the electrical card inserted into the receptacle portion to electrically connect with the pad of the shell; wherein the pad of the shell comprises two upper opposite contact ends for respectively engaging with the switch contacts; wherein the pad of the shell comprises a notch at a lower portion thereof, and wherein the insulative housing has a latch engaging with the notch; wherein the first switch contact and the second switch contact respectively has a first holdings portion and a second holding portion, the second holding portion being shorter than the first holding portion; wherein the electronic card disposed in the receptacle portion and defining a recess on a side thereof; wherein during assembling, initially the electronic card is partially inserted into the receptacle portion with the first contact portion being outwardly deflected, by means of the card, to be mechanically and electrically engaged with one of the contact ends of the pad, and successively the electronic card is fully inserted into the receptacle portion with the second contact portion being outwardly deflected, by means of the card, to be mechanically and electrically engaged with the other one of the contact ends of the pad while said first contact portion resuming in an undeflected manner without engagement with the shell and received in the recess; wherein the second switch contact includes the second contact portion extending upwardly and laterally from a rear end of the second holding portion, the second contact portion is in the same vertical line with the first holding portion and above the first holding portion.

2. The electrical card connector according to claim 1, wherein the first and the second switch contacts are respectively adapted for write-protect and full-insertion detection for the electrical card.

3. The electrical card connector according to claim 1 further includes an ejector for retaining the electrical card in a full insertion position.

4. The electrical card connector according to claim 3, wherein the insulative housing includes a side wall, an inclined surface in the side wall and a slot in a front end of the inclined surface, and the ejector includes a locking branch aligned with the inclined surface and a locking portion on a rear portion thereof.

5. The electrical card connector according to claim 4, wherein the insulative housing includes a first slit defined in a longitudinal side wall thereof and a second slit adjacent to the first slit.

* * * * *